(\*United States Patent\* [19]\*)

Azuma et al.

[11] 4,447,014
[45] May 8, 1984

[54] TIRE COMPONENT ASSEMBLY

[75] Inventors: Yusaku Azuma, Higashimurayama; Yoshifumi Kitayama, Kodaira; Chiaki Ozawa, Higashimurayama, all of Japan

[73] Assignee: Bridgestone Tire Company Limited, Tokyo, Japan

[21] Appl. No.: 352,453

[22] Filed: Feb. 25, 1982

[30] Foreign Application Priority Data

Mar. 3, 1981 [JP] Japan .................................. 56-30116

[51] Int. Cl.³ ...................... B65H 75/02; B65H 17/02
[52] U.S. Cl. ........................................ 242/55; 242/65; 242/67.1 R; 242/68.4
[58] Field of Search ................... 242/55, 56.1, 67.3 R, 242/68.4, 65, 66, 59, 67.1 R; 53/118, 119

[56] References Cited

U.S. PATENT DOCUMENTS

| 1,611,400 | 12/1926 | Andrews | 242/55 X |
| 3,049,312 | 8/1962 | Simjian | 242/67.3 R X |
| 3,970,261 | 7/1976 | McNenney et al. | 242/55 |
| 4,200,245 | 4/1980 | Bugnone | 242/68.4 X |
| 4,218,028 | 8/1980 | Pickens | 242/68.4 X |
| 4,365,767 | 12/1982 | Benthimere | 242/67.1 R |

FOREIGN PATENT DOCUMENTS 55-151450 11/1980 Japan .

\*Primary Examiner\*—John Petrakes
\*Assistant Examiner\*—David Werner
\*Attorney, Agent, or Firm\*—Cushman, Darby & Cushman

[57] ABSTRACT

Herein disclosed is a tire component storing assembly, comprising in combination: a frame structure comprising a pair of side plate members spaced apart from and substantially in parallel with each other, a first reel having opposite end portions rotatably supported on the side plate members, respectively, of the frame structure, a second reel having opposite end portions rotatably supported on the side plate members, respectively, of the frame structure, the second reel spaced apart from and substantially in parallel with the first reel, and a liner sheet having one end wound on the first reel and the other end wound on the second reel to form layers thereon, whereby a tire component is wound on any one of the first and second reels while intervening between the layers of the liner sheet to be wound on any one of the first and second reels.

1 Claim, 5 Drawing Figures

TIRE COMPONENT ASSEMBLY

FIELD OF THE INVENTION

The present invention relates to a tire component storing assembly, and more particularly to a tire component storing assembly which is adapted to continuously wind and unwind a tire component such as a carcass ply, a rubber sheet material for the purpose of transporting and storing the tire component.

An example of a prior-art tire component storing and winding apparatus of the nature to which the present invention appertains is taught in Japanese Patent Publication No. 55-151450. The tire component storing assembly herein disclosed encounters such disadvantages that a liner sheet is required to completely be wound on the other winding reel before a winding reel is released from a rotary shaft forming part of the tire component storing and winding apparatus. More specifically, in the event that the tire component is short as compared with the liner sheet, the remaining portion of the liner sheet is required to be unwound from an unwinding reel and wound on to the winding reel after the tire component has been wound on the winding reel. Moreover, in the event that the unwinding reel having the tire component wound thereon together with the sheet liner is used in a servicer forming part of a tire building apparatus, the unnecessary remaining portion of the liner sheet is required to be previously unwound from the unwinding reel, or otherwise the leading end of the tire component does not appear. As will be noted from the foregoing description, the conventional tire component storing assembly requires tedious and laborious operation, thereby causing inefficient productivity for production of tires by the reason that the remaining portion of the liner sheet is required to be unwound from a unwinding reel and wound on to the winding reel after the tire component has been wound on the winding reel and that the unnecessary remaining portion of the liner sheet is required to be previously unwound from the unwinding reel, or otherwise the leading end of the tire component does not appear. In addition, the winding reel and the unwinding reel are independently handled, thereby resulting in tedious and laborious operation to attendant operators. The end of the liner sheet is required to be fixed on an empty reel at every time when the liner sheet is unwound from the full reel for the purpose of unwinding the tire component.

It is therefore an object of the present invention to provide a tire component storing assembly which overcomes the above-mentioned drawbacks inherent in the prior-art tire component storing assembly.

It is therefore an object of the present invention to provide a tire component storing assembly which is efficient in operation and high in productivity of tires without tedious and laborious operations inherent in the prior-art tire component storing assembly.

SUMMARY OF THE INVENTION

In accordance with the present invention, there is provided a tire component storing assembly, comprising in combination: a frame structure comprising a pair of side plate members spaced apart from and substantially in parallel with each other, a first reel having opposite end portions rotatably supported on the side plate members, respectively, of the frame structure, a second reel having opposite end portions rotatably supported on the side plate members, respectively, of the frame structure, the second reel spaced apart from and substantially in parallel with the first reel, and a liner sheet having one end wound on the first reel and the other end wound on the second reel to form layers thereon, whereby a tire component is wound on any one of the first and second reels while intervening between the layers of the liner sheet to be wound on any one of the first and second reels. The tire component storing assembly may further comprise a pair of coupling members respectively projecting from the side plate members of the frame structure to be supported on a pair of hanger arms, respectively. The tire component storing assembly may further comprise reinforcing means for reinforcing the side plate members of the frame structure. The coupling members respectively have recesses open outwardly of the side plate members of the frame structure and having center axes substantially in alignment with each other, and grooves held in communication with the recesses, respectively, the grooves being open downwardly of the side plate members of the frame structure and having cross sections tapered toward the lower ends of the coupling members and toward the side plate members of the frame structure.

BRIEF DESCRIPTION OF THE DRAWINGS

The features and advantages of a tire component storing assembly according to the present invention will be more clearly understood from the following description in which.

DESCRIPTION OF THE PREFERRED EMBODIMENT

Figure 1:
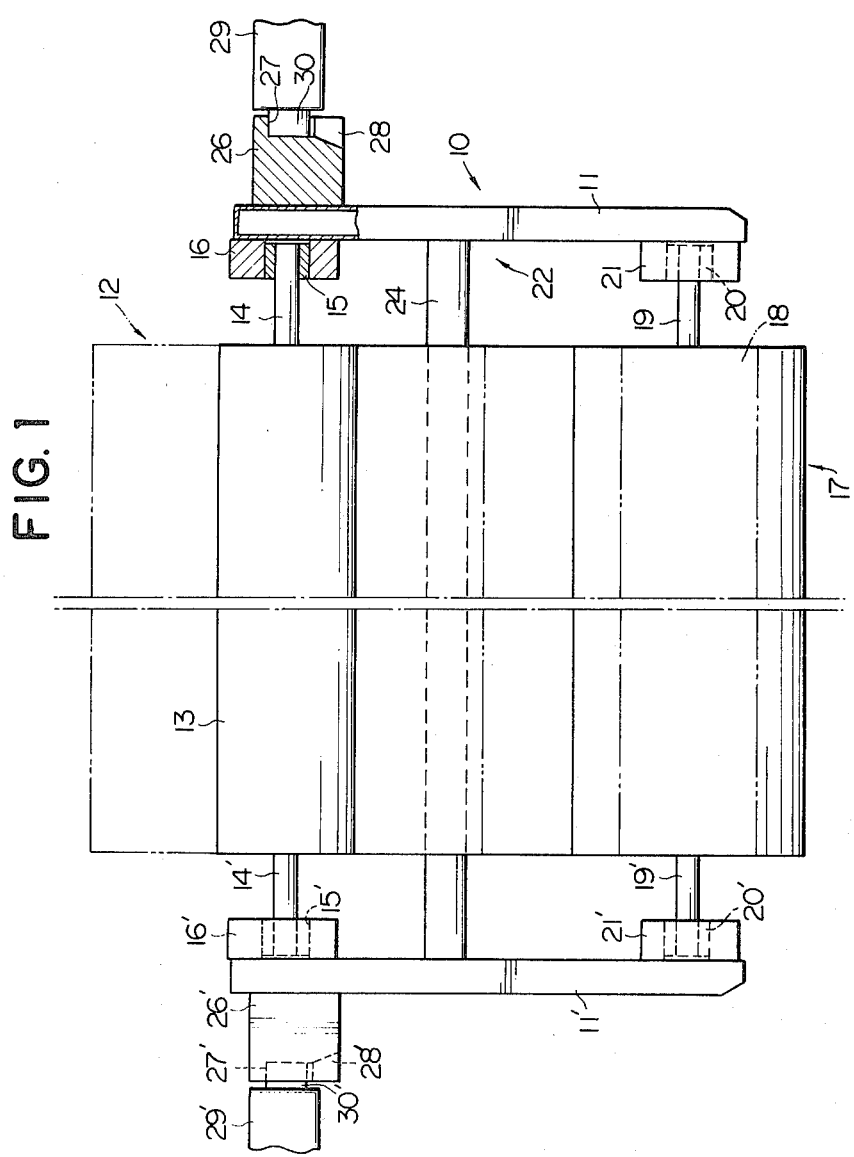
FIG. 1 is a fragmentary front elevational view of a tire component storing assembly according to the present invention and partly showing a winding apparatus.
Figure 2:
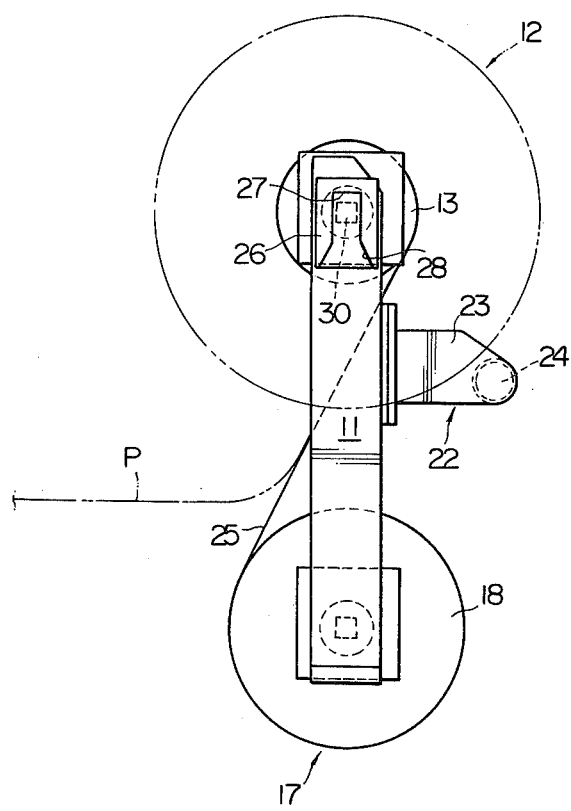
FIG. 2 is a side elevational view of the tire component storing assembly according to the present invention.

Referring now to the drawings and in particular to FIGS. 1 and 2, there is shown a preferred embodiment of a tire component storing assembly according to the present invention which comprises a frame structure 10 comprising a pair of side plate members 11 and 11' spaced apart from and substantially in parallel with each other. The tire component storing assembly further comprises a first reel 12 consisting of a cylindrical body portion 13 closed at its opposite ends and a pair of shaft portions 14 and 14' projecting from the opposite ends of the cylindrical body portion 13 and extending substantially in axial alignment with each other. The shaft portions 14 and 14' are respectively rotatably supported through bearings 15 and 15′ by boss members 16 and 16′ respectively secured to the inner surfaces of the side plate members 11 and 11′ which are in opposing relationship to each other. The previously mentioned cylindrical body portion 13 and the shaft portions 14, 14′ constitutes as a whole the first reel 12 having opposite end portions rotatably supported on the side plate members 11 and 11′, respectively, of the frame structure 10 and rotatable about its center axis with respect to the side plate members 11 and 11′ of the frame structure 10. The tire component storing assembly according to the present invention further comprises a second reel 17 consisting of a cylindrical body portion 18 closed at its opposite ends and a pair of shaft portions 19 and 19′ projecting from the opposite ends of the cylindrical body portion 18 and extending substantially in axial alignment with each other. The shaft portions 19 and 19′ are respectively rotatably supported through bearings 20 and 20′ by boss members 21 and 21′ respectively secured to the inner surfaces of the side plate members 11 and 11′ which are in opposing relationship to each other. The cylindrical body portion 13 of the first reel 12 is formed in such a manner as to have a width substantially equal to that of the cylindrical body portion 18 of the second reel 17. The previously mentioned cylindrical body portions 18 and the shaft portions 19, 19′ constitutes as a whole the second reel 17 having opposite end portions rotatably supported on the side plate members 11 and 11′, respectively, of the frame structure 10 and rotatable about its center axis with respect to the side plate members 11 and 11′ of the frame structure 10.

The tire component storing assembly according to the present invention further comprises reinforcing means 22 for reinforcing the side plate members 11 and 11′ of the frame structure 10. The reinforcing means 22 comprises a pair of bracket members 23 and 23′ respectively secured to and extending from the side plate members 11 and 11′ in directions substantially perpendicular to the plane connecting the center axes of the first and second reels 12 and 17, and a reinforcing rod 24 securely connected at longitudinally opposite end portions to the bracket members 23 and 23′ having center axes substantially in parallel with the center axes of the first and second reels 12 and 17.

The tire component storing assembly according to the present invention further comprises a liner sheet 25 made of woven fabric and having one end wound on the cylindrical body portion 13 of the first reel 12 and the other end wound on the cylindrical body portion 18 of the second reel 17 to form layers thereon. The liner sheet 25 has a width substantially equal to those of the cylindrical body portions 13 and 18 of the first and second reels 12 and 17. The liner sheet 25 thus wound on the cylindrical body portions 13 and 18 of the first and second reels 12 and 17 is held passing in crossing relationship to the plane connecting the center axes of the first and second reels 12 and 17 in the embodiment of the tire component storing assembly as shown in FIGS. 1 to 5. According to the present invention, the liner sheet 25 may be wound on the cylindrical body portions 13 and 18 of the first and second reels 12 and 17 in parallel relationship to the plane connecting the center axes of the first and second reels 12 and 17.

The tire component storing assembly according to the present invention further comprises a pair of coupling members 26 and 26′ respectively projecting from the side plate members 11 and 11′ and extending substantially in axial alignment with the axes of the first and second reels 12 and 17. The coupling members 26 and 26′ respectively have recesses 27 and 27′ open outwardly of the side plate members 11 and 11′ of the frame structure 10 and having center axes substantially in alignment with each other, and grooves 28 and 28′ held in communication with the recesses 27 and 27′, respectively, the grooves 28 and 28′ being open downwardly of the side plate members 11 and 11′ and having cross sections gradually enlarged or tapered toward the lower ends of the coupling members 26 and 26′ and toward the side plate members 11 and 11′ of the frame structure 10. A pair of hanger arms 29 and 29′ form part of a winding apparatus for winding a tire component P such as a carcass ply on the first reel 12 in a tire component producing process. The hanger arms 29 and 29′ respectively have free end portions 30 and 30′ having respective cross sections formed conformingly to those of the recesses 27 and 27′ so that the free end portions 30 and 30′ of the hanger arms 29 and 29′ and the recesses 27 and 27′ are enabled to be reliably engaged with each other without relative rotation therebetween. As will be noted from the foregoing description, the free end portions 30 and 30′ of the hanger arms 29 and 29′ can readily be passed through the grooves 28 and 28′ of the coupling members 26 and 26′ for the reason that the grooves 28 and 28′ open downwardly of the side plate members 11 and 11′ and having cross sections gradually enlarged or tapered toward the lower ends of the coupling members 26 and 26′ and toward the side plate members 11 and 11′ of the frame structure 10. The winding apparatus is shown in FIG. 4 as further comprising a drive roller 31 driven to rotate by a suitable drive mechanism not shown in the drawings to be held in contact with the layers of the liner sheet 25 wound on the first reel 12.

Figure 3:
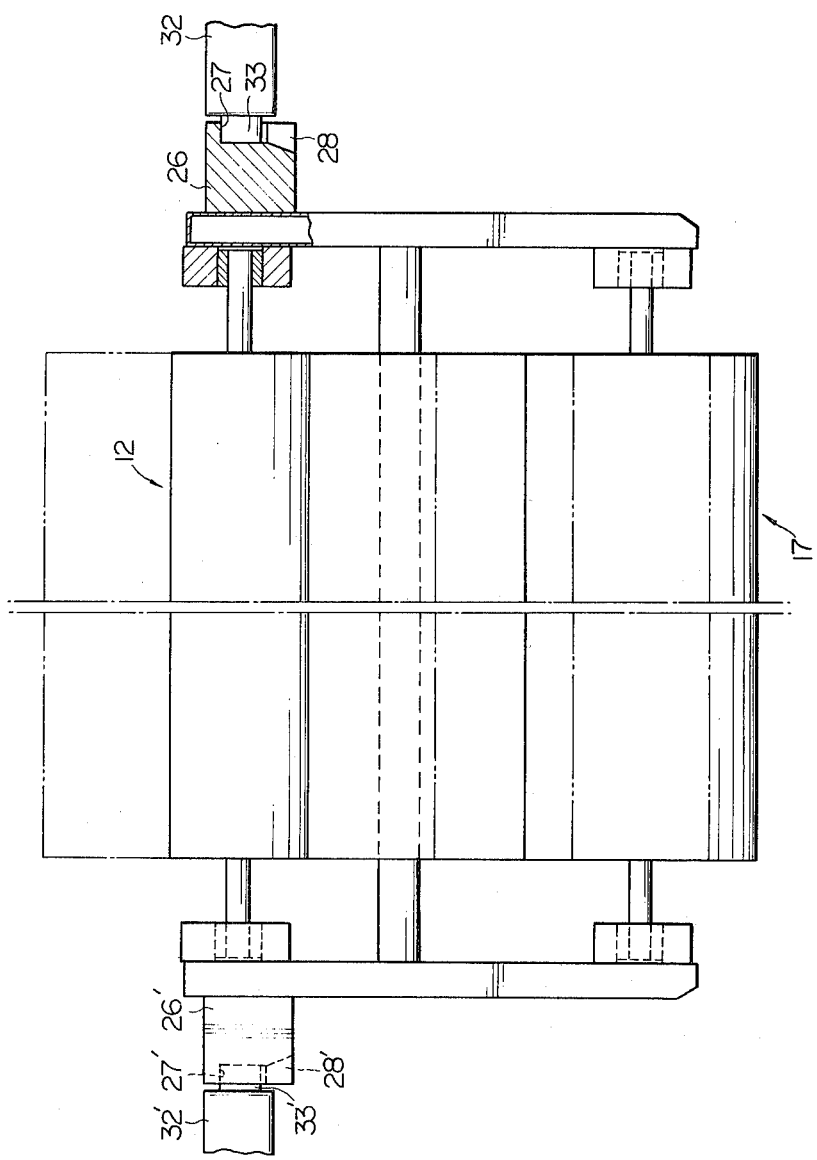
FIG. 3 is a fragmentary front elevational view of a tire component storing assembly according to the present invention and partly showing an unwinding apparatus.
Figure 5:
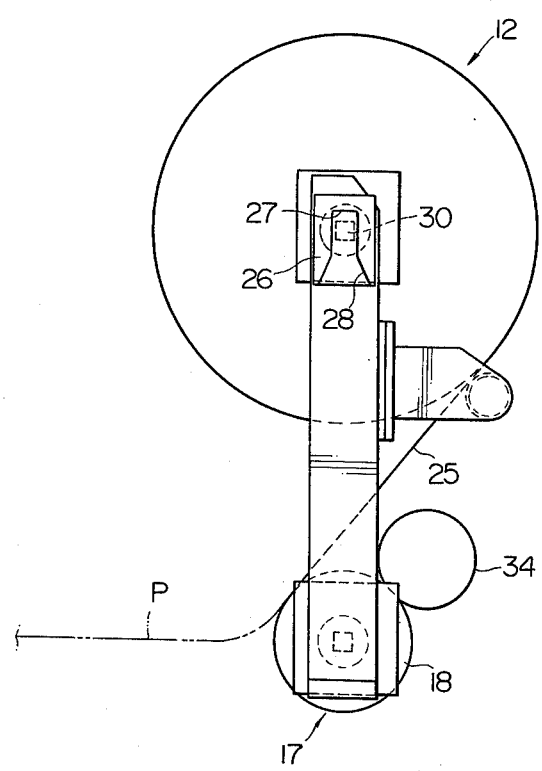
FIG. 5 is a side elevational view of the tire component storing assembly according to the present invention and showing the operational condition under which the tire component is unwound from the reel forming part of the tire component storing assembly.

FIG. 3 of the drawings shows a pair of hanger arms 32 and 32′ which form part of an unwinding apparatus for unwinding the tire component P from the first reel 12. The unwinding apparatus is used with a servicer installed in front of a tire building apparatus. In the similar manner, the hanger arms 32 and 32′ respectively have free end portions 33 and 33′ having respective cross sections formed conformingly to those of the recesses 27 and 27′ so that the free end portions 33 and 33′ of the hanger arms 32 and 32′ and the recesses 27 and 27′ are enabled to be reliably engaged with each other without relative rotation therebetween. For the similar reason as above, the free end portions 33 and 33′ of the hanger arms 32 and 32′ can readily be passed through the grooves 28 and 28′ of the coupling members 26 and 26′. Likewise, the unwinding apparatus is shown in FIG. 5 as further comprising a drive roller 34 driven to rotate by a suitable drive mechanism not shown in the drawings to be held in contact with the layers of the liner sheet 25 wound on the cylindrical body portion 18 of the second reel 17.

The description in connection with the operation of the tire component storing assembly thus constructed will be made hereinlater with reference to FIGS. 4 and 5.

Figure 4:
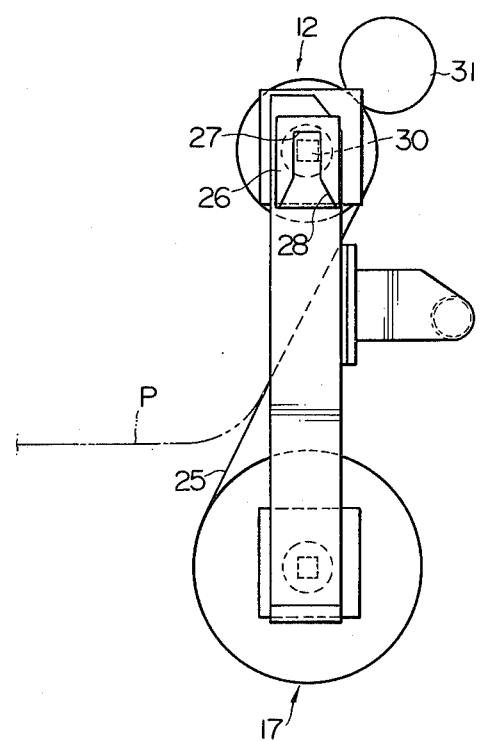
FIG. 4 is a side elevational view of the tire component storing assembly according to the present invention and showing the operational condition under which the tire component is wound on one of the reels forming part of the tire component storing assembly.

Prior to the winding operation of the tire component P on the first reel 12, the liner sheet 25 is fully wounded on the second reel 17 as shown in FIG. 4. The tire component storing assembly according to the present invention is transported to the winding apparatus by a suitable carrier mechanism. In the winding apparatus, the free end portions 30 and 30′ of the hanger arms 29 and 29' are then engaged with the recesses 27 and 27' of the coupling members 26 and 26', respectively, and the drive roller 31 is moved until the drive roller 31 is brought into contact with the first reel 12 with the liner sheet 25 held between the first reel 12 and the drive roller 31. The drive roller 31 is driven to rotate to cause the first reel 12 to be rotated in a clockwise direction in FIG. 4 so that the liner sheet 25 is unwound from the second reel 17 and wound on the first reel 12. Under these conditions, the tire component P is placed on the liner sheet 25 in an automatical and manual manner, and thus is wound on the first reel 12 together with the liner sheet 25. The tire component P is thus held intervening between the layers of the liner sheet 25. When the tire component P has been completely wound on the first reel 12, the drive roller 31 is stopped and moved away from the first reel 12. Even if the unwound liner sheet 25 partially remains on the second reel 17 at this stage, it is not necessary that the first reel 12 be rotated to cause the liner sheet 27 to be completely wound thereon. On the other hand, the tire component P is required to be severed by a suitable cutting mechanism in the case that the liner sheet 25 has been completely unwound from the second reel 17 and wound on the first reel 25.

After completion of the winding operation of the tire component P on the first reel 12, the tire component storing assembly is lifted so as to cause the recesses 27 and 27' of the coupling members 26 and 26' to be respectively disengaged from the free end portions 30 and 30' of the hanger arms 29 and 29' through the grooves 28 and 28'. The tire component storing assembly is then transported to a storage house for temporally storing the same, or the unwinding apparatus in front of the tire building apparatus. In the unwinding apparatus the free end portions 33 and 33' of the hanger arms 31 and 31' are then engaged with the recesses 27 and 27' of the coupling members 26 and 26', and the drive roller 34 is moved until the drive roller 34 is brought into contact with the second reel 17 with the liner sheet 25 held between the second reel 17 and the drive roller 34. The drive roller 34 is driven to rotate to cause the second reel 17 to be rotated in a clockwise direction in FIG. 5 so that the liner sheet 25 is unwound from the first reel 12 and wound on the second reel 17. Under these conditions, the tire component P intervening between the layers of the liner sheet 25 is unwound from the first reel 12 together with the liner sheet 25 so as to be transported to a servicer of the tire building apparatus. When the tire component P and the liner sheet 25 has been completely unwound from the first reel 12, the drive roller 34 is stopped and moved away from the second reel 17. Even if the unwound liner sheet 25 partially remains on the first reel 12 at this stage, it is not necessary that the second reel 17 be rotated to cause the liner sheet 25 to be completely wound thereon.

After completion of the unwinding operation of the tire component P from the first reel 12, the tire component storing assembly is lifted so as to cause the recesses 27 and 27' of the coupling members 26 and 26' to be respectively disengaged from the free end portions 33 and 33' of the hanger arms 32 and 32' through the grooves 28 and 28'.

While it has been described in the above that the shaft portions 19 and 19' are respectively rotatably supported through the bearings 20 and 20' by the boss members 21 and 21' respectively secured to the inner surfaces of the side plate members 11 and 11', the shaft portions 19 and 19' may be respectively directly rotatably supported on the side plate members 11 and 11' without the bearings 20 and 20' and the boss members 21 and 21'.

According to the present invention as described in details in the above, the winding reel and unwinding reel of the tire component storing assembly can be handled together, which makes it possible to facilitate handling of the tire component storing assembly. As a consequence, there is no problem encountered in the conventional tire component storing assembly that the liner sheet is required to completely be wound on the other winding reel before a winding reel is released from the rotary shaft forming part of the tire component storing and winding apparatus. More specifically, even in the event that the tire component is short as compared with the liner sheet, the remaining portion of the liner sheet is not required to be unwound from a unwinding reel and wound on to the winding reel after the tire component has been completely wound on the winding reel. Moreover, even in the event that the unwinding reel having the tire component wound thereon together with the sheet liner is used in a servicer forming part of a tire building apparatus, the unnecessary remaining portion of the liner sheet is not required to be previously unwound from the unwinding reel. As a result, the tire component storing assembly according to the present invention does not require tedious and laborious operation, thereby causing efficient productivity for production of tires by the reason that the remaining portion of the liner sheet is not required to be unwound from the unwinding reel and wound on complitely to the winding reel after the tire component has been wound on the winding reel and that the unnecessary remaining portion of the liner sheet is not required to be previously unwound from the unwinding reel. In addition, the winding reel and the unwinding reel are dependently handled, thereby resulting in no tedious and laborious operation to attendant operators. The end of the liner sheet is not required to be fixed on an empty winding reel at every time when the liner sheet is unwound from the full unwinding reel for the purpose of unwinding the tire component.

The detailed description of the preferred embodiment of the invention for the purpose of explaining the principle thereof is not to be considered as limiting or restricting the invention, as many modifications may be made by the exercise of skill in the art without departing from the spirit of the invention.

What is claimed is:

1. A tire component storing assembly, comprising in combination;
   a frame structure comprising a pair of side plate members spaced apart from and substantially in parallel with each other,
   a first reel having opposite end portions rotatably supported on said side plate members, respectively, of said frame structure,
   a second reel having opposite end portions rotatably supported on said side plate members, respectively, of said frame structure, said second reel spaced apart from and substantially in parallel with said first reel,
   a liner having one end wound at all times on said first reel and the other end wound at all times on said second reel to form layers thereon, whereby a tire component is wound on any one of said first and second reels while intervening between the layers of the liner to be wound on any one of said first and second reels, a pair of coupling members respectively projecting from the side plate members of said frame structure, a pair of supporting members for supporting said coupling members and said frame structure, the coupling members respectively having a pair of box-shaped recesses for receiving said supporting members and opening outwardly of said side plate members of said frame structure and having center axes substantially in alignment with each other, and grooves in communication with the recesses for facilitating insertion of the supporting members into the recesses, the grooves being open downwardly of said side plate members of said frame structure and having cross sections tapered toward the lower ends of the coupling members and toward said side plate members, and reinforcing means for reinforcing said side plate members of said frame structure.

* * * * *